(12) United States Patent
Masleid et al.

(10) Patent No.: US 9,178,750 B2
(45) Date of Patent: Nov. 3, 2015

(54) POST-SILICON REPAIR OF ON-DIE NETWORKS

(71) Applicant: Oracle International Corporation, Redwood City, CA (US)

(72) Inventors: Robert P Masleid, Monte Sereno, CA (US); Paul J Dickinson, San Jose, CA (US); Murali M R Gala, San Jose, CA (US); Karl P Dahlgren, Fremon, CA (US)

(73) Assignee: Oracle International Corporation, Redwood Shores, CA (US)

( * ) Notice: Subject to any disclaimer, the term of this patent is extended or adjusted under 35 U.S.C. 154(b) by 273 days.

(21) Appl. No.: 13/681,052

(22) Filed: Nov. 19, 2012

(65) Prior Publication Data

US 2014/0140205 A1 May 22, 2014

(51) Int. Cl.
*H04L 29/14* (2006.01)
(52) U.S. Cl.
CPC .................... *H04L 29/14* (2013.01)

(58) Field of Classification Search
USPC .................................................. 370/228, 229
See application file for complete search history.

(56) References Cited

U.S. PATENT DOCUMENTS

| | | | |
|---|---|---|---|
| 8,583,850 B2 | 11/2013 | Masleid et al. | |
| 8,717,889 B2 | 5/2014 | Thomas | |
| 8,717,892 B2 | 5/2014 | Berman et al. | |
| 2008/0162998 A1* | 7/2008 | Likovich et al. | 714/28 |
| 2014/0112125 A1* | 4/2014 | Frey et al. | 370/228 |

* cited by examiner

*Primary Examiner* — Huy D Vu
*Assistant Examiner* — Teisha D Hall
(74) *Attorney, Agent, or Firm* — Meyertons Hood Kivlin Kowert & Goetzel; Erik A. Heter (57) ABSTRACT

A method and apparatus for post-silicon repair of on-die networks is disclosed. In one embodiment, an integrated circuit includes a first network node of an on-chip network configured to couple each of a plurality of functional units to at least one other one of the plurality of functional units. The first network node includes a plurality of ports. Each of the plurality of ports includes a plurality of multiplexers configured to substitute a spare channel of the network node into the network responsive to a test determining that another one of a plurality of channels is defective.

14 Claims, 7 Drawing Sheets

POST-SILICON REPAIR OF ON-DIE NETWORKS

BACKGROUND

1. Technical Field

This disclosure relates to integrated circuits, and more particularly, to integrated circuits having on-die networks.

2. Description of the Related Art

The effort to increase the amount of computing power on a single integrated circuit (IC) die has, in recent years, led to the design and manufacture of multi-core processors. A multi-core processor effectively implements two or more processors on a single IC die by providing two or more respective processing cores. Each of the cores may include dedicated cache memories and other circuitry. However, some cache memories may be shared among the cores. Similarly, input/output (I/O) interfaces and other circuitry may also be shared among the cores. System level random access memory (RAM) may also be shared by the cores of a multi-core processor. For various reasons (e.g., maintaining cache coherency, performing parallel computing tasks, etc.), communications may be performed between the various agents (e.g., cores, cache memories, I/O interfaces) of a multi-core processor. In order to support such communications, an on-chip network or a network node may be provided.

An on-die network may be used to connect every agent on the IC die to every other agent. Such an approach may provide efficient communications between a given pair of agents. However, on-die networks may include a large number of interconnections and other logic. In particular, an on-die network may include large numbers of wires, various queues, multiplexers, repeaters, arbitration logic, and so on. This may consume a substantial amount of die area, and may also provide a large number of defect opportunities. Therefore, prior to shipping units of such an IC, extensive testing may be performed to ensure the integrity of the network. If the network does not function properly during such testing, the IC upon which it is implemented may be discarded.

SUMMARY OF THE DISCLOSURE

A method and apparatus for post-silicon repair of on-die networks is disclosed. In one embodiment, an integrated circuit includes a first network node of an on-chip network configured to couple each of a plurality of functional units to at least one other one of the plurality of functional units. The first network node includes a plurality of ports. Each of the plurality of ports includes a plurality of multiplexers configured to substitute a spare channel of the network node into the network responsive to a test determining that another one of a plurality of channels is defective.

In one embodiment, a method includes testing an on-chip network of an integrated circuit. The on-chip network is configured to couple each of a plurality of functional units to at least one other one of the plurality of functional units. Responsive to determining that a particular channel of the on-chip network is defective, the on-chip network may be reconfigured to connect a spare channel into the on-chip network using a plurality of multiplexers in a network node of the on-chip network.

In another embodiment, a processor includes a plurality of processor cores and an on-chip network. The on-chip network is configured to provide an N-bit connection for each of the plurality of processor cores to any other one of the plurality of processor cores. The on-chip network includes one or more network nodes. Each of the one or more network nodes includes N channels, each of which slices includes logic circuitry corresponding to a corresponding one of the N bits of the N-bit connection. The network node also include a spare channel including logic circuitry corresponding to a spare bit. Each network node also includes a plurality of ports, wherein each of the plurality of ports includes a plurality of multiplexers configured to, responsive to a test determining that one of the N channels is defective, disconnect the defective one of the N channels from and connect the spare channel. It is noted that N is an integer value greater than one.

BRIEF DESCRIPTION OF THE DRAWINGS

Other aspects of the disclosure will become apparent upon reading the following detailed description and upon reference to the accompanying drawings, which are now described as follows.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling within the spirit and scope of the present invention as defined by the appended claims.

DETAILED DESCRIPTION

The present disclosure is generally directed to post-silicon repair of on-chip networks. The ability to repair an on-chip network post-silicon may allow an IC to retain its ability to function properly even if there is a defect in some of the network circuitry. In particular, the faulty circuitry may be disconnected from the network, while spare circuitry may be substituted into the network.

In various embodiments, on-chip networks may be implemented using one or more network nodes arranged to couple functional units (or agents) of an IC to one another. Each network node may include circuitry for a number of channels. A channel may be defined herein as circuitry and interconnections that correspond to a particular bit in the network (e.g., circuitry and connections for channel 0 corresponds to bit 0 of an on-chip network having multiple bit connections between the functional units). Circuitry corresponding to an extra channel may also be provided in each network node. Given that there can be a large number of channels in an on-chip network, there may be a significant opportunity for defects that may negatively impact the manufacturing yield for the corresponding IC. However, the likelihood that the circuitry and channels of the spare channel are defective is significantly less than the likelihood that there is a defect elsewhere in the network. Accordingly, the provision of a spare channel in the network nodes may thus provide a high likelihood that the spare channel may enable replacement of a defective channel in the network and thus enable post-silicon repair of the on-die network.

The effective substitution of a spare channel for a defective channel may be accomplished as follows. Subsequent to its manufacture, a test of an IC having an on-chip network may be conducted. If, during test, a particular channel of the on-chip network is found to be defective, one or more network nodes may be reconfigured. Reconfiguring may include disconnecting the defective channel from the on-chip network, and connecting the spare channel to the network. The test may be re-conducted. If the test is successful, then the on-chip network has thus been repaired. In some embodiments, information regarding the reconfiguration may be stored in a storage unit (e.g., fuses, flash memory, etc.).

Figure 1:
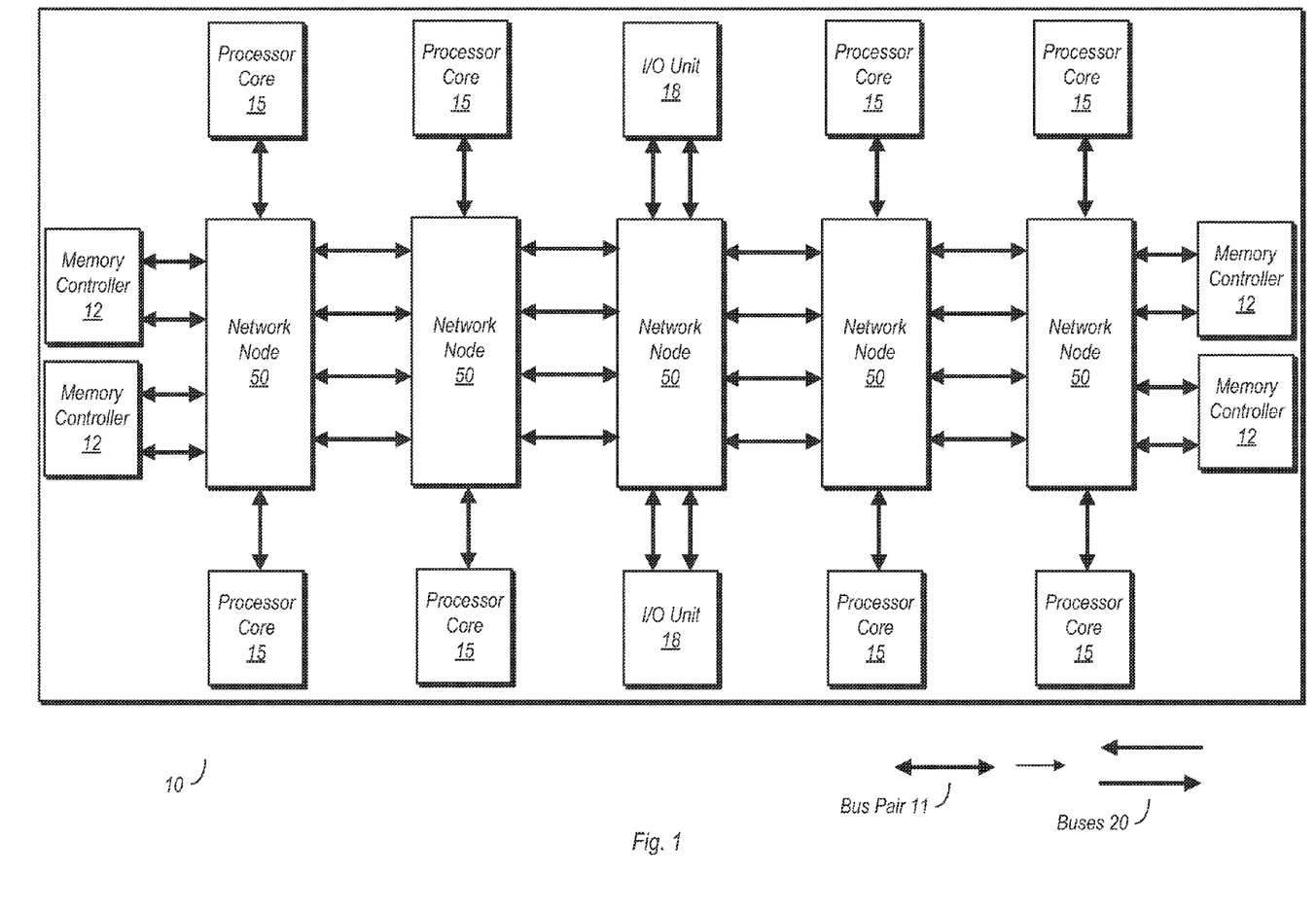
FIG. 1 is a block diagram of one embodiment of an integrated circuit (IC) having an on-chip network.

Turning now to FIG. 1, a block diagram of one embodiment of an IC having an on-die network is illustrated. In the embodiment shown, IC 10 includes four memory controllers 12, eight processor cores 15, and two input/output (I/O) units 18. Each of these various agents may be coupled to any one of the others of IC 10 through an on-die data network that includes five instances of network node 50, and a number of unidirectional buses 20 depicted here as bus pairs 11. Although not explicitly shown, IC 10 may also include a number of on-chip memories such as cache memories, random access memories, and so on. These memories may also be coupled to the various network nodes shown.

In the embodiment shown, the on-chip network may be used to connect any of the agents shown to any other one of the agents shown, via the various network nodes 50. For example, any of the processor cores 15 may be connected to any other one of the processor cores 15 through one or more network nodes 50. In another example, any one of the memory controllers 12 may be coupled to either one of the I/O units 18 in the illustrated embodiment. The ability to connect any one of the agents to any other one of the agents may facilitate communications for various purposes, such as maintaining cache coherency among the processor cores 15, coordinating memory accesses, re-allocating processing workloads, and so on.

Each bus pair 11, represented here by the bidirectional arrows, includes two physically separate unidirectional buses 20. Each bus 20 of a given bus pair 11 is arranged (through coupling of transmitters and receivers) to convey signals in one direction only. Furthermore, counterpart buses 20 of each bus pair 11 are arranged to convey signals in opposite directions. It is noted that embodiments in which buses are implemented as bidirectional buses are also possible and contemplated.

Each of the buses 20 may include a total of N signal lines, and may thus be N bits wide. In one exemplary embodiment, each bus may include 128 (N=128) signal lines each. In general, N may be any suitable integer value greater than one. The buses may convey data signals, control signals, address signals, error correction code (ECC) signals, and so forth. Various instances of buses 20 may be connected to one another through correspondingly coupled network nodes. In this particular embodiment, network nodes 20 are implemented as crossbars, and thus the topology of the network is a crossbar network. However, other types of network nodes and corresponding network topologies are possible and contemplated.

One network node 50 (centrally located in the embodiment shown) is a 12×12 network node. That is, that particular instance network node 50 in the embodiment shown is coupled to receive inputs from 12 unique instances of buses 20, and is further coupled to provide outputs to 12 unique instances of buses 20. The other network node 50 are each 10×10 network nodes, each coupled to 10 incoming buses and 10 outgoing buses. Each of the network nodes is configured to couple one of its incoming buses to one of its outgoing buses in order to facilitate communications between a given pair of agents of IC 10. Although not explicitly shown here for the sake of simplicity, each of network nodes 50 may be coupled to receive select signals to enable the coupling of a selected incoming bus to a selected outgoing bus.

Since each of the buses 20 is N bits wide in the illustrated embodiment, each network node 50 include N channels, one for each bit. As used herein, the term channel may be defined to include circuitry within an on-chip network that supports a particular bit of an N-bit bus. For example, channel 0 may include circuitry in the on-chip network that supports bit 0. The circuitry of the channels, which will be discussed in further detail below, is configured to couple signal lines of an incoming and outgoing bus, with the coupled signal lines being arranged to convey bits of equal significance. For example, a given network node circuit may couple a bit 0 signal line of an incoming bus to a bit 0 signal line of an outgoing bus. Each channel may include various types of circuitry, including repeaters, buffers, storage queues, flop circuits, and so on. In addition to the N channels, each network node 50 may include circuitry corresponding to a spare channel. In addition to the N wires of a given bus 20, each bus 20 may include at least one wire corresponding to a spare channel. Thus, the network 10 may include circuitry and wires corresponding to N+1 channels, even though the network 10 provides N connections.

During testing of IC 10, if one of the N channels is found to be defective, network nodes 50 may be reconfigured to effectively disconnect the circuitry and wires corresponding to the defective channel. The circuitry corresponding to the spare channel may then be connected to allow for substitution of the defective channel. This effectively allows for a post-silicon repair of the on-chip network. By repairing the on-chip network post-silicon, an otherwise faulty instance of an IC may be salvaged as a useful part instead of being discarded. Additional details regarding post-silicon repair of on-chip networks are discussed below.

Figure 2:
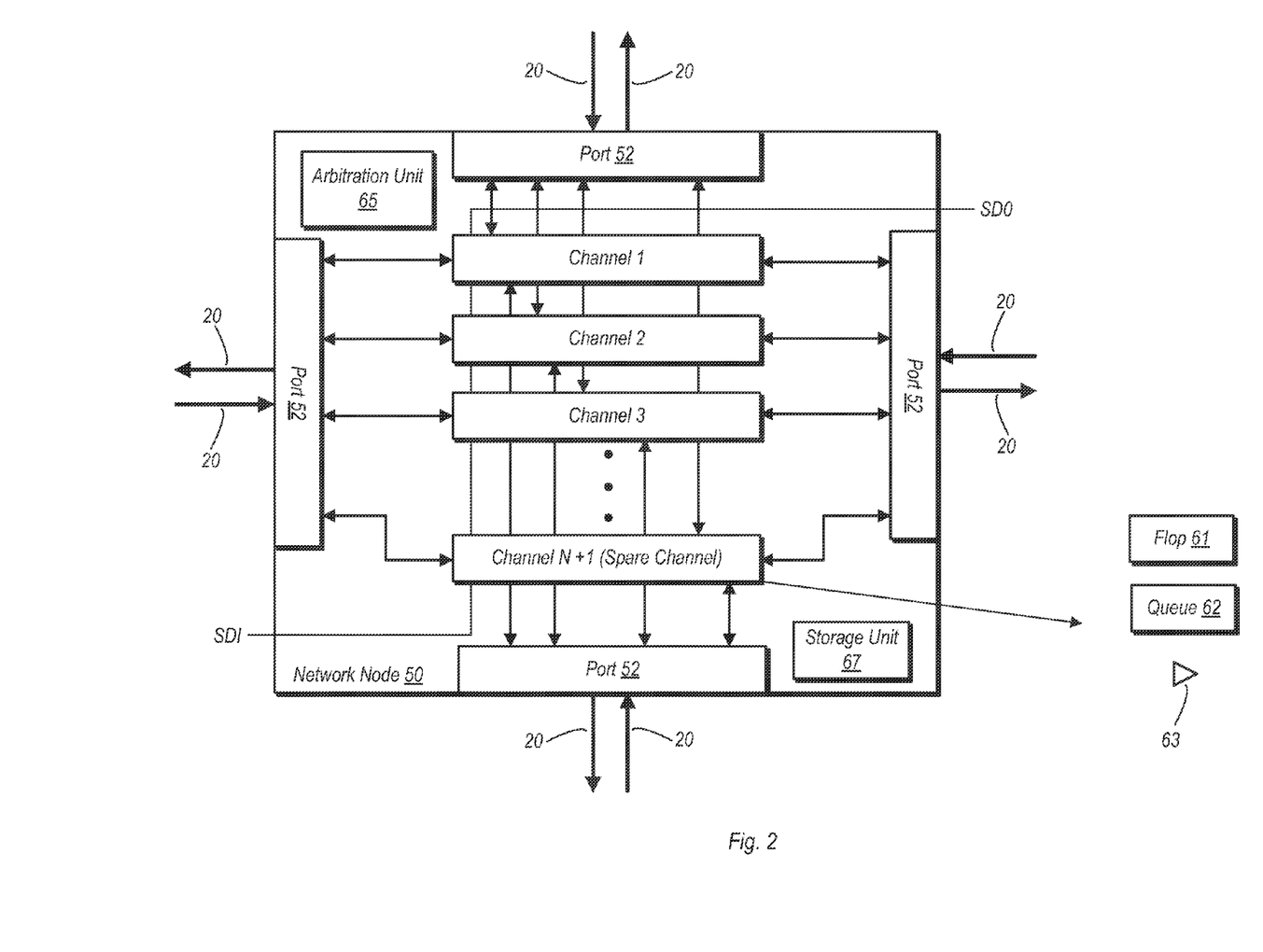
FIG. 2 is a block diagram of one embodiment of a network node in an on-chip network.

Turning now to FIG. 2, a block diagram of one embodiment of a network node in an on-chip network is shown. In the embodiment shown, network node 50 includes four ports 52, each of which is coupled to a respective incoming bus 20 and a respective outgoing bus 20. It is noted that the number of ports in this embodiment is exemplary, and other embodiments may be implemented using any suitable number of ports.

Network node 50 includes a number of internal channels. Each of the channels includes various types of circuitry, including flops 61 (which may be master-slave flip-flops or latches), one or more queues 62, and buffers 63. Additionally, each of the channels may include switching circuitry for connecting any port to any other port. More particularly, the switching circuitry within each channel may connect an incoming bus 20 of any port to an outgoing bus 20 of any of the other ports. Using queues 62, multiple transactions between the various ports 52 may be supported in various directions. At any given moment, inputs of the channels may be connected to one port 52 receiving traffic from an incoming bus 20, and one port 52 for which traffic is to be transmitted on an outgoing bus 20. The switching circuitry within each channel may be reconfigured as necessary to route queued transactions when they are to be conveyed to another port 52 and to an outgoing bus 20. The order in which transactions are conveyed between ports may be controlled by arbitration unit 65, which may be configured to perform any suitable arbitration scheme (e.g., round robin, priority based schemes, etc.).

In the embodiment shown, network node 50 includes a spare channel. Each of the incoming buses 20 is configured to convey a total of N or N+1 bits. Similarly, each of the outgoing buses is configured to convey N or N+1 bits. The number of channels implemented in network node 50 is N+1. The spare channel may be used as a substitute in the event of a failure one of the other channels. For example, at the end of the manufacturing process, an IC including network node 50 may be tested to determine if the N channels (excluding the spare) are properly functioning. If one of the channels fails, network node 50 may be configured to enable the spare channel while effectively disabling the failing channel. Thus, a failure of a single channel in network node 50 may not be fatal to the part in which it occurs. Instead, the spare channel may be used as a substitute, enabling the part to function as intended. It is noted that while network node 50 in this embodiment includes one spare channel, embodiments with additional spare channels (and thus the ability to substitute for multiple failing channels) are possible and contemplated. In embodiments where an IC includes multiple instances of network node 50 (or variations thereof), the substitution of a failing channel may be performed in each of the network nodes 50 even if the failing channel is confined to a single instance.

In the embodiment shown, network node 50 is configured to support scan testing. Accordingly, network node 50 includes a scan data input (SDI), a scan data output (SDO), and a chain of scan elements coupled therebetween. For the sake of simplicity, the scan elements are not shown. The scan elements may be coupled to circuitry within each of the channels, including the spare. However, initial testing may exclude the spare channel, focusing on the original N channels intended for use in network node 50. Should the testing find that each of the original N channels is functioning properly, no further testing is performed, and the spare channel is not substituted for another failing channel. If a channel fails during testing, network node 50 may be reconfigured in order to effectively disable the failing channel while enabling the spare channel. Subsequent to this reconfiguration, testing may be conducted again, this time including the spare channel. If the testing determines that the spare channel and the remaining ones of the N original channels are functioning correctly, then the part may still be used for implementation in a system. Otherwise, if the spare channel fails, the part may be scrapped.

Reconfiguring of network node 50 may be conducted by reconfiguring each of ports 52 to connect to both inputs and outputs of the spare channel while disconnecting at least one of the channel input or output of the defective channel for that port. Additional details regarding the reconfiguring of ports 52 to enable the spare channel and disable the defective channel are discussed below in reference to FIGS. 3, 4A, and 4B.

In the embodiment shown, network node 50 includes a storage unit 67. When network node 50 is reconfigured due to a failing channel, reconfiguration information may be stored within storage unit 67. During subsequent system start-ups and initialization of the IC in which network node 50 is implemented, storage unit 67 may be accessed to set ports 52 in their proper configurations to enable the spare channel while disabling the defective channel. Storage unit 67 may be implemented in various ways. In one embodiment, storage unit 67 may be implemented as a flash memory. Other embodiments are possible and contemplated in which storage unit 67 is implemented using a read only memory (ROM), programmable fuses, or any other suitable type of storage circuitry.

Figure 3:
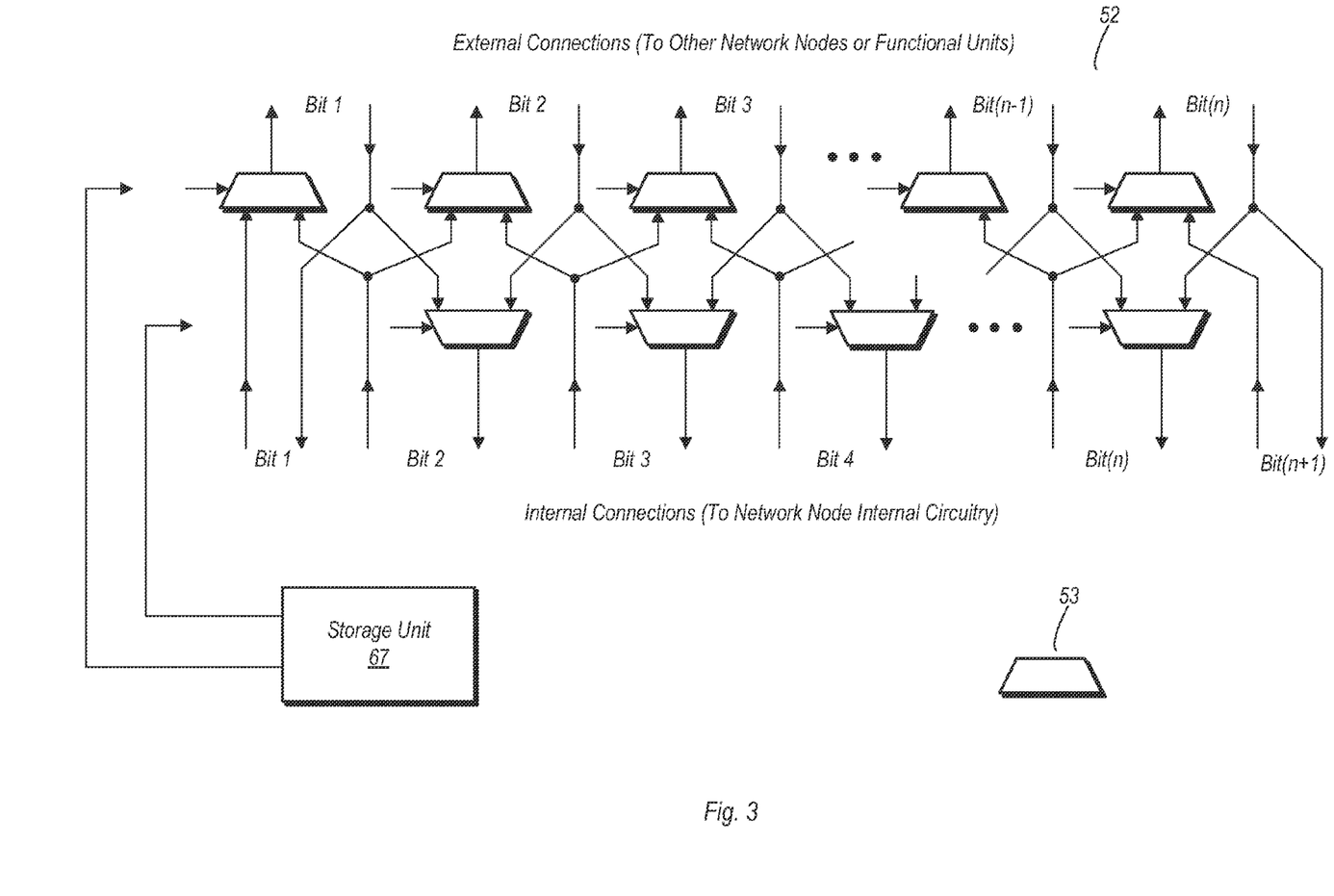
FIG. 3 is a schematic diagram illustrating one embodiment of a port on a network node.

FIG. 3 is a schematic diagram illustrating one embodiment a port on a network node. In the embodiment shown, port 52 includes a plurality of multiplexers 53. Some of the multiplexers 53 have outputs coupled to signal paths of an outgoing bus, while other multiplexers 53 have outputs coupled to network node internal circuitry. In total, there are 2N multiplexers 53 in the illustrated embodiment of port 52, with N multiplexers 53 arranged to route outgoing data bits and N multiplexers 53 arranged to route incoming bits. Storage unit 67 is coupled to provide select inputs to each of the multiplexers 53. The state of a signal applied to a selection input of each multiplexer 53 may depend on whether the spare channel is to be used while another defective channel is to be disconnected.

Each of the N multiplexers 53 coupled to route outgoing bits has inputs for two bits. For example, a first multiplexer 53 in the drawing (top row, far left) is coupled to receive bit 1 on one input and bit 2 on another input. The next multiplexer 53 (to the right of the first) is coupled to receive bit 2 on one input and bit 3 on another input. This arrangement repeats up to the last multiplexer 53 in the top row, which is coupled to receive bit(n) on one input and bit(n+1) on another input.

The N multiplexers arranged to route incoming bits are each configured in a similar manner. The first incoming multiplexer 53 in the embodiment shown (bottom row, far left), is coupled to receive bit 1 on a first input and bit 2 on a second input. Bit 1 incoming may take one of two paths, the first being to the first multiplexer 53, and the second path in which it connects directly to a first channel in the network node. The second incoming multiplexer 53 in the embodiment shown is coupled to receive bit 2 on a first input and bit 3 on a second input. This arrangement repeats until the last multiplexer, which is coupled to receive bit(n−1) on one input and bit(n) on another input. Bit(n) incoming may be routed directly to its respective input of the last multiplexer 53, or directly to the spare channel in the network node.

Figure 4A:
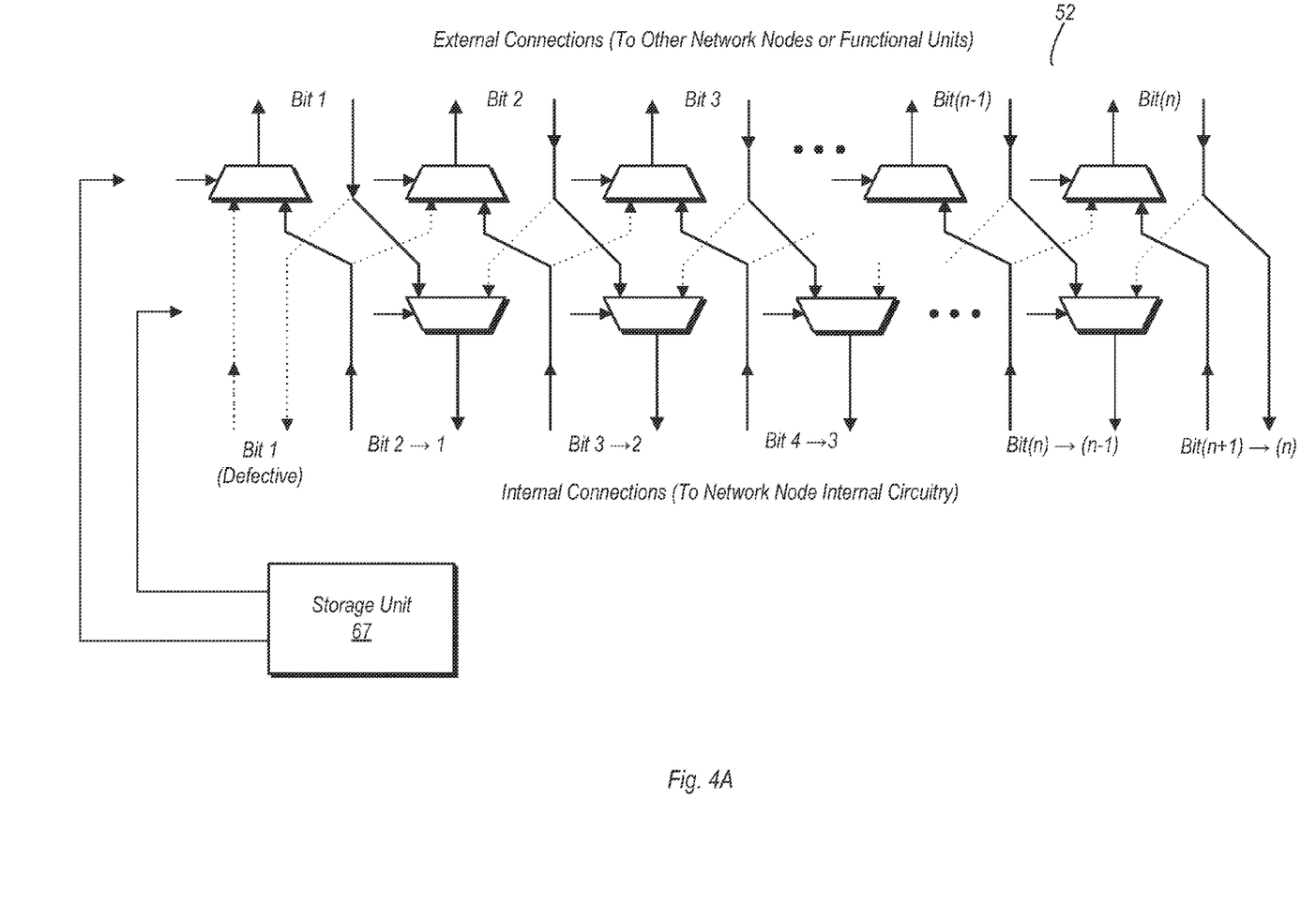
FIGS. 4A and 4B are examples of using multiplexers in a port of one embodiment of a network node for shifting around defective channels.
Figure 4B:
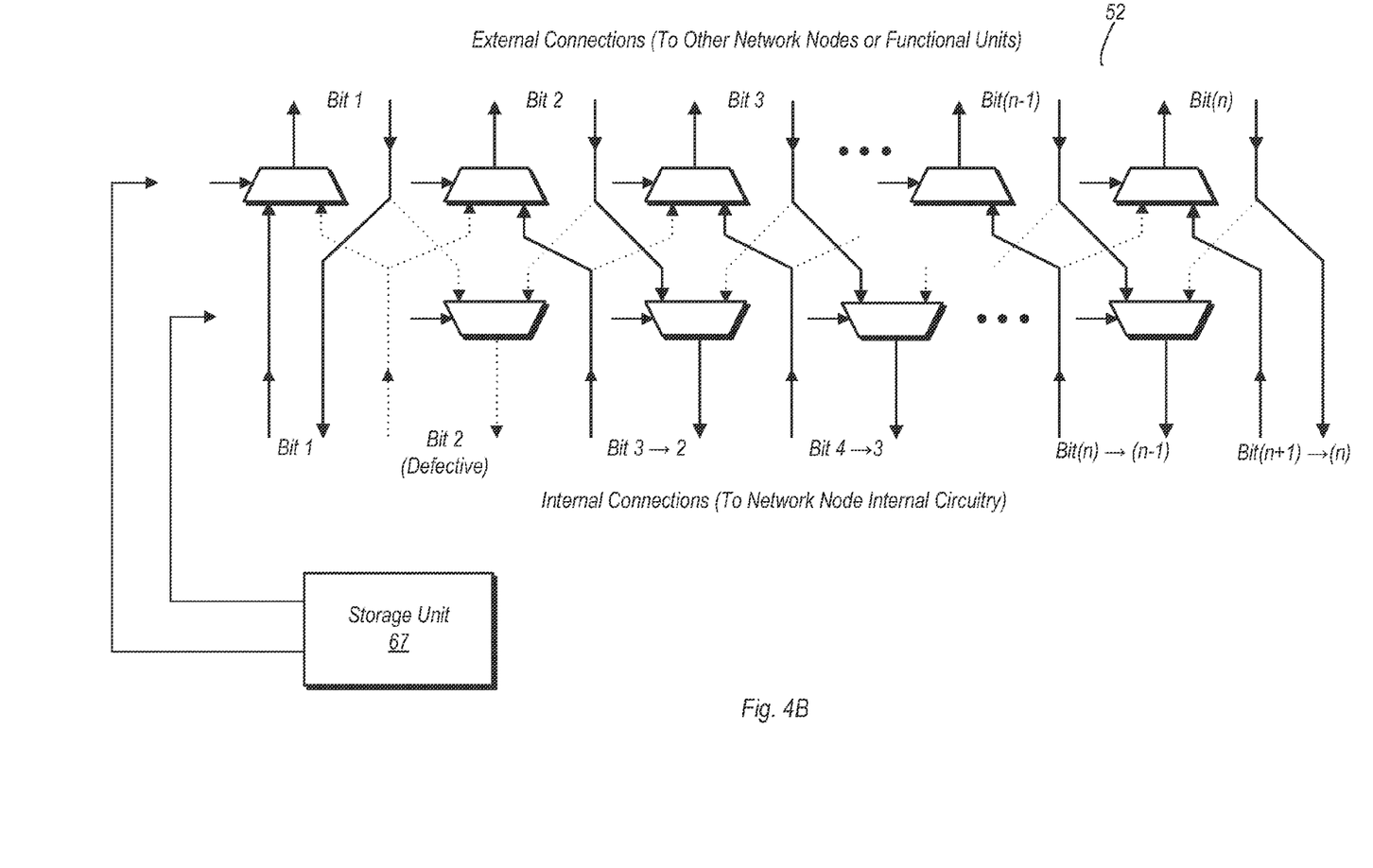

FIGS. 4A and 4B are examples of using multiplexers in a port of one embodiment of a network node for shifting around defective channels. The examples shown use the embodiment of the port 52 discussed above with reference to FIG. 3, although other embodiments of a port having the capability to enable substitution of a spare channel for a defective channel are possible and contemplated.

In the example shown in FIG. 4A, channel 1 (corresponding to the original bit 1) is defective. In a normal configuration (i.e., wherein no channels are defective), the first multiplexer 53 of the top row would select bit 1, the second multiplexer bit 2, and so on. When channel 1 is defective, it may be effectively disconnected from the network, while the spare channel may be connected into the network to enable another channel to be substituted for channel 1. In FIG. 4A, multiplexers 53 are configured to pass the inputs received via the solid lines, while the dashed lines represent non-selected signal paths. Thus, the first multiplexer 53 in the top row, far left, is coupled to receive bit 2 (from channel 2), while the second multiplexer is coupled to receive bit 3 (from channel 3), and so on until the last multiplexer, which is coupled to receive bit(n+1) from the spare channel. Thus, bit 2 effectively becomes bit 1, bit 3 effectively becomes bit 2, and so on, with bit(n+1) becoming bit(n). Thus, with channel 1 defective in this example, each of the outgoing bits is effectively shifted left by one bit to become the next lower bit (e.g., 2 to 1, 3 to 2, etc.).

In the bottom row of multiplexers 53 (coupled to receive incoming bits), the first multiplexer (far left) is selected to pass bit 1, the second multiplexer is selected to pass bit 2, and so on. In a normal configuration, the first multiplexer 53 in the bottom row would select bit 2, the second multiplexer would select bit 3, and so on. When bit 1 is defective as in this example, the first multiplexer 53 selects bit 1, the second multiplexer selects bit 2, and so on, with the last multiplexer selecting bit(n−1). Bit(n) is routed directly to channel(n+1). Thus, each incoming bit is effectively shifted one channel to the right when bit 1 is defective, while the channels process the next lower bit (e.g., channel 2 processes bit 1, channel 3 processes bit 2, and so on).

In the example shown in FIG. 4B, channel 2 is defective. In this case, the first multiplexer 53 in the top row selects bit 1, while the incoming bit 1 is routed directly to channel 1, which is equivalent to the normal condition where no channels are defective. The second multiplexer 53 in the top row, in this example, is arranged to select bit 3, the third multiplexer 53 is arranged to select bit 4, and so on, with the last multiplexer (the $n^{th}$ multiplexer 53) being arranged to select bit(n+1). Thus, the bits to the right of the bit associated with the defective channel are effectively shifted left to a lower position. Thus bit 3 effectively becomes bit 2 (i.e., channel 3 processes bit 2), and so on.

For the incoming bits above bit 1, the first multiplexer 53 in the bottom row may be disabled, and thus no bit is provided to the defective channel 2. The second multiplexer 53 may be configured to select bit 2, where it is selected to pass bit 3 in the normal configuration. Similarly, the third multiplexer 53 may be configured to select bit 3 (instead of bit 4) and so on, with the last multiplexer 53 being configured to select bit(n−1).

Thus, for the illustrated embodiment, channels associated with a bit that is a higher order bit than that associated with the defective channel are effectively reconfigured to process the next lower bit. Thus, for the example shown in FIG. 4B, channel 3 may process bit 2, channel 4 may process bit 3, and so on. Incoming bits of higher order than the defective channel may be effectively routed to the channel associated with the next higher order bit. Thus, for the example shown, incoming bit 2 is routed to channel 3, incoming bit 3 is routed to channel 4, and so on. For outgoing bits in this example, channel 3 may provide a bit to the second multiplexer 53 (which selects the output from channel 2 in a normal, non-defective configuration), channel 4 may provide a bit to the third multiplexer 53, and so on.

Figure 5:
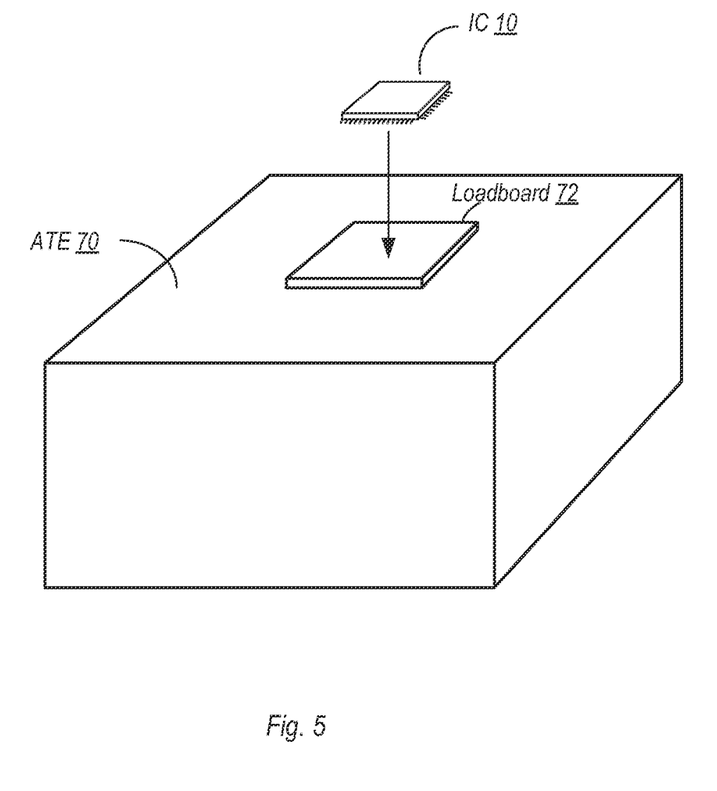
FIG. 5 is a drawing of one embodiment of an IC test system.

FIG. 5 is a drawing of one embodiment of an ATE (automated test equipment) system configured for testing IC's. In the embodiment shown, ATE 70 is a test system configured for testing integrated circuits, such as IC 10. ATE 70 includes a loadboard 72 configured for coupling IC 10 to ATE 70. Loadboard 72 is configured to provide electrical connections between ATE 70 and IC 10, and may provide any electrical loading or termination necessary to ensure the integrity of signals transferred therebetween. ATE 70 is configured to provide test signals and stimulus to IC 10, and is further configured to receive and analyze test response signals and data received from IC 10. To apply stimulus to IC 10, ATE 70 may execute a test program. The test program may be generated using automatic test program generation (ATPG) tools that use various information about the design of IC 10. Such information my include, but is not limited to, netlists, types of logic circuits, input and output paths, rated operating clock speeds, and so on. Network node connectivity may be created for all N+1 channels using ATPG. However, actual tests may be created for N channels only, with the multiplexers selecting only N channels at a given time during test. Thus, no extra tests are created for the spare channel. If a defective channel is detected during a test of the originally tested N channels, multiplexers may deselect the defective channel and select the spare channel, as discussed above. Another test may be conducted for N channels, this time including the spare channel and excluding the defective channel.

IC 10 is an integrated circuit package having one or more die, packaging, and pin connections. The package and pin connections may comprise a ball grid array, pin grid array, quad flat pack, or any other type of packaging/pin connection arrangement that may be suitable for the integrated circuit die packaged therein. IC 10 may comprise virtually any type of integrated circuit, such as a microprocessor, a digital signal processing chip, an application specific integrated circuit (ASIC) or other type. ATE 70 is configured to test the functionality of IC 10, its electrical characteristics, or both.

In the embodiment shown, ATE 70 may perform scan testing of IC 10. As noted above, IC 10 may include one or more scan chains via which test stimulus data may be shifted into the device. Each of the scan chains may include a number of serially-coupled scan elements. Each of the scan elements may be coupled to logic circuitry within IC 10. The logic circuitry to which scan elements are coupled may include circuitry within each network node of IC 10, and more particularly, to the individual channels of IC 10. After the test stimulus data has been shifted into the appropriate scan elements, it may be applied to the logic circuitry within IC 10. One or more clock cycles may be input into IC 10 to apply the test stimulus data to the logic circuitry. After the clock cycles have been completed, test result data may be captured into the scan elements of the scan chain. Subsequent to capture, another shift operation may be performed to shift the test result data from IC 10 and into ATE 70 for analysis.

During testing of IC 10, it may be determined whether any of the channels in the on-chip network are defective. If a defective channel is found, ATE 70 may input stimulus into IC 10 to reconfigure the on-chip network by disconnecting the defective channel and connecting the spare channel into the network as described above. Following this reconfiguration, another iteration of the test may be performed in order to determine if the reconfiguration was successful and the on-chip network is functioning properly. If the test determines that the on-chip network is functioning properly, IC 10 may be shipped to the customer (assuming it passed other tests as well). Otherwise, if the on-chip network is not functioning correctly even after the reconfiguration, the part may be scrapped.

Figure 6:
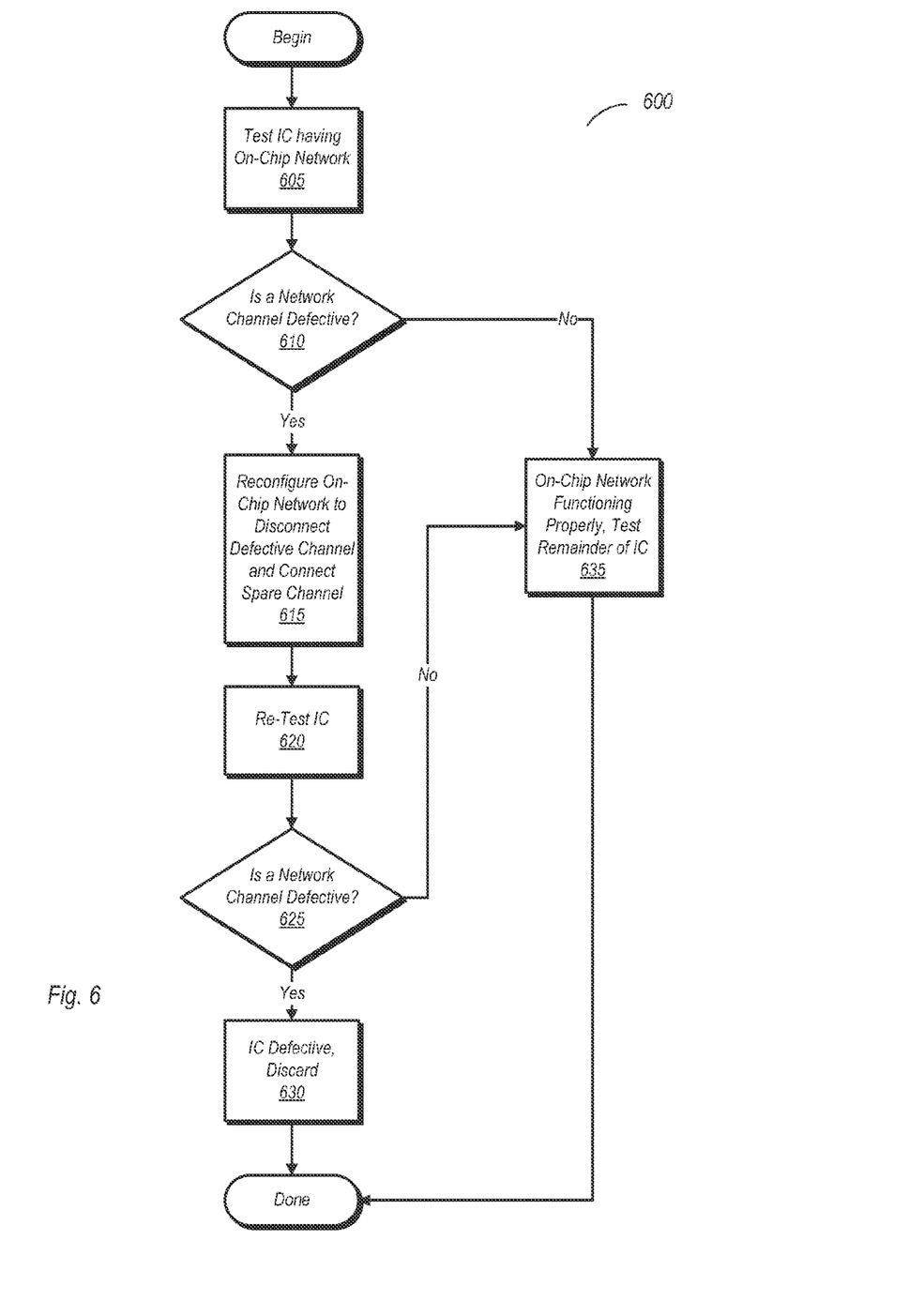
FIG. 6 is a flow diagram of one embodiment of a method for performing a post-silicon repair of an on-chip network.

FIG. 6 is a flow diagram of one embodiment of a method for performing a post-silicon repair of an on-chip network. The embodiment of method 600 illustrated in FIG. 6 may be carried out by the various hardware embodiments discussed above with reference to FIGS. 1-4B. However, it is also possible and contemplated that other hardware embodiments not explicitly discussed herein may also carry out method 600. Furthermore, while the various embodiments method and apparatus embodiments discussed herein have been directed to hardware having only a single spare channel, embodiments in which multiple spare channels are provided are also possible and contemplated.

Method 600 begins with the testing of an IC having an on-chip network (block 605). In one embodiment, testing of the IC may comprise scan testing as described above. However, embodiments of method 600 that utilize other forms of testing the IC are possible and contemplated. During the testing, the on-chip network may be exercised in order to verify its functionality. If none of the network channels is found to be defective (block 610, no), then the on-chip network may be considered to be functioning properly, and other portions of the IC may be tested (block 635).

If a channel is found to be defective during the testing of the on-chip network (block 610, yes), the on-chip network may be reconfigured by disconnecting the defective channel from the network and connecting the spare channel into the network (block 615). In one embodiment, the disconnecting the defective channel and connecting the spare channel may be conducted in each network node even though the defective channel is present in only one network node.

After reconfiguring the on-chip network, the IC may be re-tested (block 620). The re-test may include the spare channel, while ignoring the defective channel. If none of the channels tested during the re-test is found to be defective (block 625, no), then other portions of the IC may be tested (block 635). Otherwise, if the on-chip network still fails to function properly due to a defective channel (block 625, yes), then the IC may be considered to be defective and may thus be discarded (block 630).

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

What is claimed is:

1. A method comprising:
   testing an on-chip network of an integrated circuit, wherein the on-chip network is configured to couple each of a plurality of functional units to at least one other one of the plurality of functional units, wherein testing the on-chip network comprises testing a first network node, wherein the first network node includes a plurality of ports each having N external connections and N+1 internal connections, wherein each of the N+1 internal connections is coupled to channel circuitry corresponding to a particular bit of the on-chip network and further includes testing channel circuitry coupled to N of the N+1 internal connections of the network node and excludes testing channel circuitry coupled to the $(N+1)^{th}$ internal connections;
   responsive to determining that a particular channel of the on-chip network is defective, reconfiguring the on-chip network to connect a spare channel into the on-chip network using a plurality of multiplexers in a network node of the on-chip network, wherein the on-chip network includes a plurality of network nodes including the first network node, wherein shifting around the particular channel further comprises multiplexers in each port of each of the plurality of network nodes coupling channel circuitry coupled to the $(N+1)^{th}$ internal connection to one of the N external connections and further comprises multiplexers decoupling circuitry associated with the defective channel.

2. The method as recited in claim 1, wherein connecting the spare channel comprises multiplexers in each port of the first network node coupling channel circuitry coupled the $(N+1)^{th}$ internal connection to one of the N external connections and further comprises multiplexers decoupling circuitry associated with the defective channel.

3. The method as recited in claim 1, wherein testing the channel circuitry comprises conducting one or more scan tests of the channel circuitry.

4. The method as recited in claim 1, wherein the channel circuitry includes one or more of the following types of circuits:
   storage queues;
   flop circuits; and
   buffers.

5. The method as recited in claim 1, wherein, during normal operations, N of N+1 channels are active, and wherein one of the N+1 channels is inactive.

6. A processor comprising:
   a plurality of processor cores; and
   an on-chip network configured to provide an N-bit connection for each of the plurality of processor cores to any other one of the plurality of processor cores, wherein the on-chip network includes one or more network nodes, wherein each of the one or more network nodes includes:
      N channels, wherein each of the N channels includes logic circuitry corresponding to a one of the N bits of the N-bit connection;
      a spare channel including logic circuitry corresponding to a spare bit;
      a plurality of ports, wherein each of the plurality of ports includes a plurality of multiplexers configured to, responsive to a test determining that one of the N channels is defective, disconnect the defective one of the N channels from and connect the spare channel.

7. The processor as recited in claim 6, wherein each of the plurality of ports includes N+1 internal connections, wherein N of the internal connections are each coupled to a corresponding one of the N channels, and wherein one of the N+1 internal connections is coupled to the spare channel, and wherein each of the plurality of ports is further coupled to N external connections.

8. The processor as recited in claim 6, wherein each of the N channels includes scan test circuitry.

9. The processor as recited in claim 6, wherein the plurality of multiplexers in each of the plurality of ports includes N output multiplexers each coupled to provide an output to a corresponding one of N connections external to a corresponding one of the plurality of network notes that includes that one of the plurality of ports, wherein an $N^{th}$ one of the N output multiplexers is coupled to receive, as inputs, an $N^{th}$ bit and an $(N+1)^{th}$ bit.

10. The processor as recited in claim 9, wherein the plurality of multiplexers in each of the plurality of ports includes N input multiplexers each having an output to a corresponding one of N connections internal to a corresponding one of the plurality of network nodes that includes that one of the plurality of ports, wherein an $N^{th}$ one of the N input multiplexers is coupled to receive, as inputs, an $N^{th}$ bit and an $(N-1)^{th}$ bit.

11. The processor as recited in claim 10, wherein each of the N input multiplexers and each of the N output multiplexers are 2-1 multiplexers.

12. The processor as recited in claim 6, wherein each of the plurality of ports is coupled to an N-bit bus external to its corresponding one of the one or more network nodes and further is having N+1 connections to circuitry internal to its corresponding one of the one or more network nodes.

13. The processor as recited in claim 6, wherein each of the N+1 channels includes one or more of the following circuits associated with that channel:
   storage queues;
   flop circuits; and
   buffers.

14. The processor as recited in claim 13, wherein, during normal operations, N of the N+1 channels are active, and wherein one of the N+1 channels is inactive.

\* \* \* \* \*

UNITED STATES PATENT AND TRADEMARK OFFICE
CERTIFICATE OF CORRECTION

PATENT NO. : 9,178,750 B2  
APPLICATION NO. : 13/681052  
DATED : November 3, 2015  
INVENTOR(S) : Masleid et al.

Page 1 of 1

It is certified that error appears in the above-identified patent and that said Letters Patent is hereby corrected as shown below:

On Title Page, column 1, under item (72) inventors, line 4, delete "Fremon, CA" and insert -- Fremont, CA --, therefor.

Signed and Sealed this
Twenty-eighth Day of June, 2016

Michelle K. Lee
*Director of the United States Patent and Trademark Office*